(12) United States Patent
Kamo

(10) Patent No.: US 10,322,566 B2
(45) Date of Patent: Jun. 18, 2019

(54) VEHICLE

(71) Applicant: Nidec Corporation, Kyoto (JP)

(72) Inventor: Hiroyuki Kamo, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 128 days.

(21) Appl. No.: 15/408,667

(22) Filed: Jan. 18, 2017

(65) Prior Publication Data

US 2017/0207514 A1    Jul. 20, 2017

(30) Foreign Application Priority Data

Jan. 19, 2016 (JP) ................................ 2016-008158

(51) Int. Cl.
*H01Q 1/32* (2006.01)
*B32B 17/10* (2006.01)
(Continued)

(52) U.S. Cl.
CPC .......... *B32B 17/10036* (2013.01); *B32B 7/05* (2019.01); *B32B 17/00* (2013.01); *B32B 27/08* (2013.01); *B32B 27/285* (2013.01); *B32B 27/30* (2013.01); *B32B 27/302* (2013.01); *B32B 27/365* (2013.01); *G01S 13/867* (2013.01); *G01S 13/931* (2013.01); *H01Q 1/1271* (2013.01); *H01Q 1/3266* (2013.01); *B32B 2250/03* (2013.01); *B32B 2250/04* (2013.01); *B32B 2250/05* (2013.01); *B32B 2250/40* (2013.01); *B32B 2307/204* (2013.01); *B32B 2307/41* (2013.01); *B32B 2307/412* (2013.01); *B32B 2307/416* (2013.01); *B32B 2307/418* (2013.01); *B32B 2307/42* (2013.01); *B32B 2307/546* (2013.01); *B32B 2307/702* (2013.01); *B32B 2307/732* (2013.01); *B32B 2605/006* (2013.01); *B60J 1/02* (2013.01); *G01S 2013/9392* (2013.01)

(58) Field of Classification Search
CPC .......................... H01Q 1/1271; H01Q 1/3275; H01Q 1/1278; H01Q 7/00
USPC ................................ 343/713, 718, 720, 878
See application file for complete search history.

(56) References Cited

U.S. PATENT DOCUMENTS

| | | |
|---|---|---|
| 2,659,884 A | 11/1953 | McMillan et al. |
| 3,002,190 A | 9/1961 | Oleesky et al. |

(Continued)

FOREIGN PATENT DOCUMENTS

| | | |
|---|---|---|
| CN | 204936956 U | 1/2016 |
| EP | 0 888 646 B1 | 1/1999 |
| WO | 2006/035510 A1 | 4/2006 |

*Primary Examiner* — Dameon E Levi
*Assistant Examiner* — Collin Dawkins
(74) *Attorney, Agent, or Firm* — Keating & Bennett, LLP

(57) ABSTRACT

A vehicle includes laminated glass located between a vehicle interior and an outside, and an on-vehicle radar device fixed to an inner surface of the laminated glass, a rear-view mirror, or a ceiling. The laminated glass includes an innermost glass layer, an outermost glass layer, and an intermediate resin layer. The on-vehicle radar device includes an antenna part that includes a transmitting antenna for transmitting a transmission wave. Reflection of the transmission wave on the laminated glass will be suppressed by selecting optimum values for the incident angle of the transmission wave on the innermost glass layer and the refractive index and thickness of each layer.

23 Claims, 9 Drawing Sheets

(51) Int. Cl.

| | |
|---|---|
| *G01S 13/93* | (2006.01) |
| *B32B 17/00* | (2006.01) |
| *B32B 27/08* | (2006.01) |
| *B32B 27/28* | (2006.01) |
| *B32B 27/30* | (2006.01) |
| *B32B 27/36* | (2006.01) |
| *G01S 13/86* | (2006.01) |
| *H01Q 1/12* | (2006.01) |
| *B32B 7/05* | (2019.01) |
| *B60J 1/02* | (2006.01) |

(56) References Cited

U.S. PATENT DOCUMENTS

| | | | |
|---|---|---|---|
| 3,780,374 | A | 12/1973 | Shibano et al. |
| 4,179,699 | A | 12/1979 | Lunden |
| 4,677,443 | A | 6/1987 | Koetje et al. |
| 4,725,475 | A | 2/1988 | Fiscus et al. |
| 5,017,939 | A | 5/1991 | Wu |
| 5,408,244 | A | 4/1995 | Mackenzie |
| 6,028,565 | A | 2/2000 | Mackenzie et al. |
| 7,460,054 | B2 | 12/2008 | Kim et al. |
| 8,604,968 | B2 | 12/2013 | Alland et al. |
| 2010/0039346 | A1 | 2/2010 | Peter et al. |
| 2010/0214194 | A1* | 8/2010 | Kanou ............. B32B 17/10036 345/4 |
| 2011/0163904 | A1* | 7/2011 | Alland ................. B60R 1/00 342/1 |
| 2016/0093944 | A1 | 3/2016 | Kamo |

\* cited by examiner

VEHICLE

TECHNICAL FIELD

The present invention relates to a vehicle including an on-vehicle radar device.

BACKGROUND ART

Research into areas such as collision avoidance, driving assistance, and automatic driving has been conducted in recent years, using technology for detecting objects around a vehicle with radar. Automobiles conventionally have radar on their front noses. A high-frequency oscillator needs to be provided in the vicinity of an antenna, and water and weather proofing measures, such as using a Radome for protection, are also necessary against wind and rain. Meanwhile, more sophisticated detection technology has also been developed, using both radar detection and camera images.

U.S. Pat. No. 8,604,968 proposes a radar-camera sensor in which a radar and a camera are housed in a single housing. The radar-camera sensor is mounted on the windshield of an automobile forward of the rear-view mirror. A radar wave is either a vertically or horizontally polarized radio wave.

International Publication No. WO/2006/035510 discloses an external-field-of-vehicle recognizing apparatus that is a multifunctional sensor unit in which an image capturing part and a transmission/reception part are mounted on a single sensor mounting board. The multifunctional sensor unit is installed in the interior of a vehicle.

When a radar device is provided in the interior of a vehicle, a radar wave is attenuated by being reflected and absorbed by the windshield. The influence of the glass increases if a short-wavelength radio wave is used to improve the resolution of the radar. Besides, it is not possible to increase the output of the high-frequency oscillator because there are statutory regulations governing the output of high-frequency oscillators available for use with vehicles. As a result, the distance that can be monitored by the radar is reduced.

European Patent No. 888646 discloses a method in which, when a communication antenna is installed in the interior of a vehicle, a dielectric intermediate element is disposed between glass and the radiating surface of an antenna in order to suppress the reflection of a radio wave on the glass. According to European Patent No. 888646, the electrically effective distance between the glass and the antenna is adjusted to several times the half-wavelength of the radio wave.

The windshield used in a vehicle such as an automobile is transparent and seemingly made of a single glass plate, but in actuality, they are made of three-layer laminated glass in which two sheets of glass are laminated on inner and outer sides of an extremely thin resin film, in order to ensure the safety of passengers. It has conventionally been thought that treating the windshield as a single glass plate, as in the case of viewing the windshield with visible light, would be enough to obtain accurate results. However, the inventor of the present invention has found this assumption to be wrong and recognized the need to focus on each layer of the laminated glass and take measures to suppress reflection. The present invention has been achieved on the basis of the idea of dividing the laminated glass into each layer and taking measures to suppress reflection on a layer-by-layer basis.

SUMMARY OF INVENTION

The present invention is intended for a vehicle including an on-vehicle radar device, and it is an object of the present invention to suppress a reduction in the efficiency of transmission and reception of radio waves when the on-vehicle radar device is disposed in the interior of the vehicle.

A vehicle accordingly to an exemplary embodiment of the present invention includes a vehicle body, a drive mechanism for moving the vehicle body, laminated glass fixed to the vehicle body and located between a vehicle interior and an outside, and an on-vehicle radar device fixed directly or indirectly to an inner surface of the laminated glass, a rear-view mirror arranged inward of the inner surface, or a ceiling. The laminated glass includes an innermost glass layer, an outermost glass layer, and an intermediate resin layer sandwiched between the innermost glass layer and the outermost glass layer.

The on-vehicle radar device includes an antenna part for transmitting a transmission wave from inside the innermost glass layer to outside the outermost glass layer, the transmission wave being a radio wave in a millimeter waveband, and receiving a received wave that enters inside the innermost glass layer from outside the outermost glass layer. The antenna part includes a transmitting antenna for transmitting the transmission wave. The transmission wave has a vertical polarization component greater than a horizontal polarization component thereof with respect to the laminated glass.

Formulas 1 and 2 are satisfied, where $\theta_a$ is an angle formed by a normal to the laminated glass and a direction of propagation of the transmission wave at a center of a main lobe of the transmitting antenna, $n_1$, $n_2$, and $n_3$ are respectively refractive indices of three layers including inner, middle, and outer layers that are in contact with one another and that are selected from among an air layer located inward of the innermost glass layer, the innermost glass layer, the intermediate resin layer, the outermost glass layer, and an air layer located outward of the outermost glass layer, $d_2$ is a thickness of the middle layer, and N is an integer of 0 or more.

If $n_1 < n_2 < n_3$ or $n_1 > n_2 >$ [Formula 1]
$n_3$ and $\theta_a$ is smaller than or greater than both of
$\sin^{-1}\left(n_1 \sin\left(\tan^{-1}\frac{n_2}{n_1}\right)\right)$ and $\sin^{-1}\left(n_2 \sin\left(\tan^{-1}\frac{n_3}{n_2}\right)\right)$, $$\frac{\left(2N + \frac{3}{4}\right)n_2 \lambda \cos\left(\sin^{-1}\left(\frac{1}{n_2}\sin\theta_a\right)\right)}{4(n_2^2 - \sin^2\theta_a)} \le d_2 \le$$

$$\frac{\left(2N + \frac{5}{4}\right)n_2 \lambda \cos\left(\sin^{-1}\left(\frac{1}{n_2}\sin\theta_a\right)\right)}{4(n_2^2 - \sin^2\theta_a)}, \text{ and}$$

if $n_1 < n_2 < n_3$ or $n_1 > n_2 >$
$n_3$ and $\theta_a$ is a value between or equal to one of
$\sin^{-1}\left(n_1 \sin\left(\tan^{-1}\frac{n_2}{n_1}\right)\right)$ and $\sin^{-1}\left(n_2 \sin\left(\tan^{-1}\frac{n_3}{n_2}\right)\right)$, $$\frac{\left(2N + \frac{7}{4}\right)n_2 \lambda \cos\left(\sin^{-1}\left(\frac{1}{n_2}\sin\theta_a\right)\right)}{4(n_2^2 - \sin^2\theta_a)} \le d_2 \le$$

$$\frac{\left(2N + \frac{9}{4}\right)n_2 \lambda \cos\left(\sin^{-1}\left(\frac{1}{n_2}\sin\theta_a\right)\right)}{4(n_2^2 - \sin^2\theta_a)}$$

-continued

If $n_1 > n_2 < n_3$ or $n_1 < n_2 >$ [Formula 2]
$n_3$ and $\theta_a$ is smaller than or greater than both of
$\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N+\frac{7}{4}\right)n_2\lambda\cos\left(\sin^{-1}\left(\frac{1}{n_2}\sin\theta_a\right)\right)}{4(n_2^2-\sin^2\theta_a)} \le d_2 \le$$

$$\frac{\left(2N+\frac{9}{4}\right)n_2\lambda\cos\left(\sin^{-1}\left(\frac{1}{n_2}\sin\theta_a\right)\right)}{4(n_2^2-\sin^2\theta_a)}, \text{ and}$$

if $n_1 > n_2 < n_3$ or $n_1 < n_2 >$
$n_3$ and $\theta_a$ is a value between or equal to one of
$\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le d_2 \le$$

$$\frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)}$$

If the horizontal polarization component of the transmission wave is greater than a vertical polarization component thereof with respect to the laminated glass, Formulas 3 and 4 are satisfied.

If $n_1 < n_2 < n_3$ or $n_1 > n_2 > n_3$, [Formula 3]

$$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)}$$

If $n_1 > n_2 < n_3$ or $n_1 < n_2 > n_3$, [Formula 4]

$$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)}$$

According to the present invention, it is possible to suppress a reduction in the efficiency of transmission and reception of radio waves in the on-vehicle radar device disposed in the interior of the vehicle.

These and other objects, features, aspects and advantages of the present invention will become more apparent from the following detailed description of the present invention when taken in conjunction with the accompanying drawings.

DESCRIPTION OF EMBODIMENTS

Figure 1:
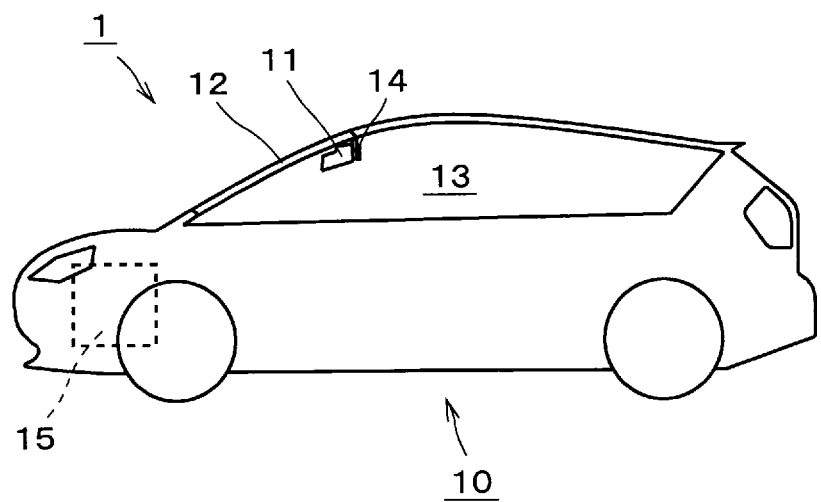
FIG. 1 is a simplified side view of a vehicle.

FIG. 1 is a simplified side view of a vehicle 1 according to an exemplary embodiment of the present invention. The vehicle 1 is a passenger car and includes an on-vehicle radar device 11 (hereinafter, referred to as a "radar device").

The radar device 11 is used for purposes such as collision avoidance, driving assistance, and automatic driving. The radar device 11 is mounted on the inner surface of a windshield 12 of the vehicle 1 and located in a vehicle interior 13. The vehicle interior 13 does not need to be a completely isolated space separated from the outside, and may be open-roofed, for example. The radar device 11 is located forward of a rear-view mirror 14 mounted on the windshield 12. The vehicle 1 includes a drive mechanism 15 for moving a vehicle body 10. The drive mechanism 15 includes, for example, an engine, a steering mechanism, a power transmission mechanism, and wheels.

The windshield 12 is fixed to the vehicle body 10 and located between the vehicle interior 13 and the outside. The windshield 12 is laminated glass in which a film is sandwiched between two sheets of glass. The windshield 12 is hereinafter also referred to as "laminated glass." The radar device 11 is fixed to the inner surface of the laminated glass 12 either directly or indirectly via a mounting member, such as a bracket. As another form of mounting, the radar device 11 may be mounted on the rear-view mirror or the ceiling. In the present embodiment, the radar device 11 is indirectly fixed to the laminated glass 12 via a bracket.

Figure 2:
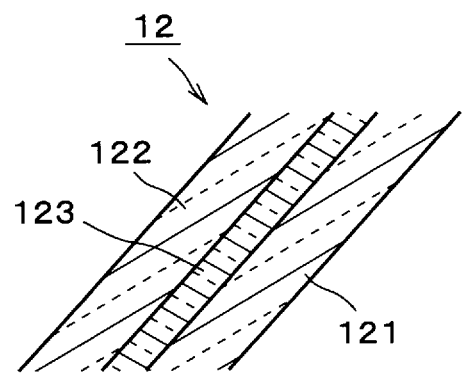
FIG. 2 is a cross-sectional view of laminated glass.

As illustrated in FIG. 2, the laminated glass 12 includes an innermost glass layer 121, an outermost glass layer 122, and an intermediate resin layer 123. The intermediate resin layer 123 is located between the innermost glass layer 121 and the outermost glass layer 122. That is, the innermost glass layer 121, the intermediate resin layer 123, and the outermost glass layer 122 are arranged in the stated order when viewed from the vehicle interior 13. The laminated glass 12 may also include other interlayers as long as these three layers serve as primary constituent elements. In the present embodiment, the innermost glass layer 121 and the outermost glass layer 122 are made of soda-lime glass. The innermost glass layer 121 and the outermost glass layer 122 may have the same optical properties, or may have different optical properties. The intermediate resin layer 123 is preferably made of polyvinyl butyrate (PVB), and may include a plurality of resin layers stacked on top of each other.

Figure 3:
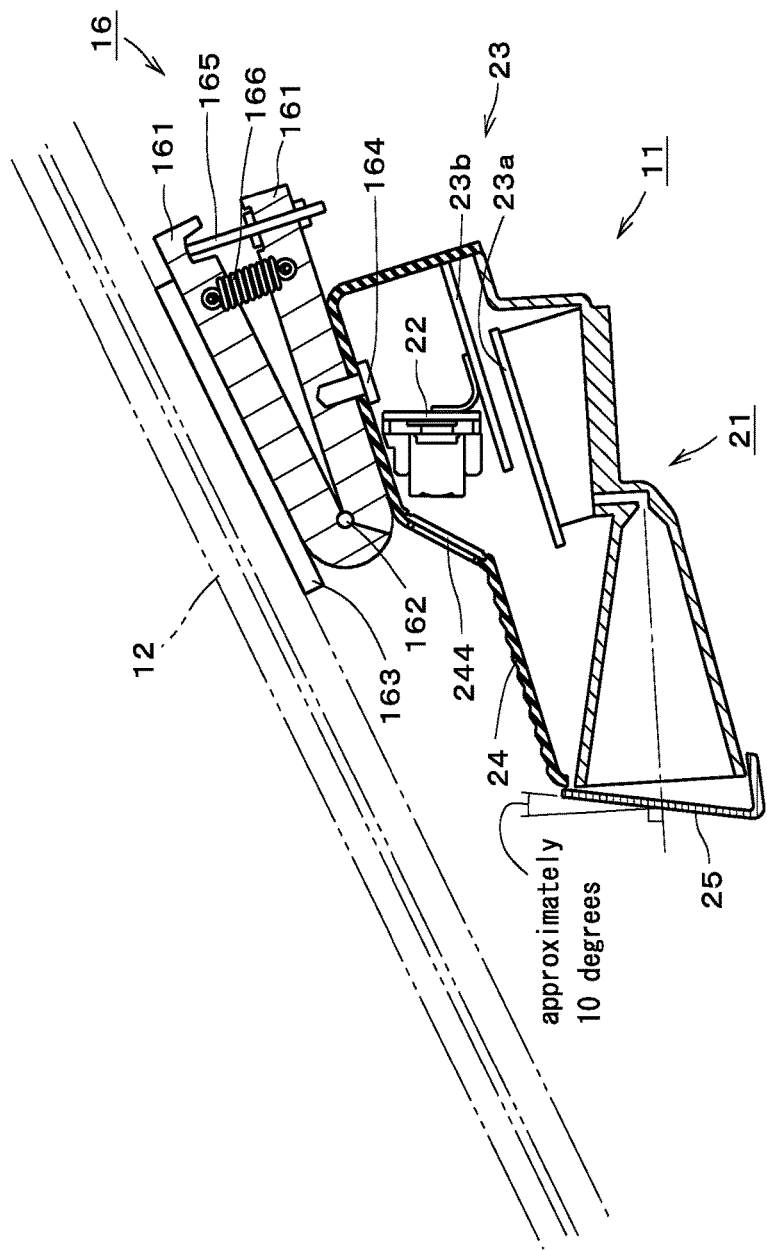
FIG. 3 is a cross-sectional view of a radar device mounted on the laminated glass.

FIG. 3 is a cross-sectional view of the radar device 11 mounted on the laminated glass 12. Hatching has been omitted from the details of the cross section. As described previously, the radar device 11 is fixed to the laminated glass 12 via a bracket 16. The radar device 11 is removably attached to the bracket 16.

The bracket 16 includes two plate parts 161 and a connecting part 162. The two plate parts 161 are located approximately overlapping with each other, with their front ends rotatably coupled by the connecting part 162. The upper surface of the upper plate part 161 is firmly fixed to the laminated glass 12 with an adhesion member 163. The bracket 16 may be fixed by other methods to the innermost glass layer 121. The lower surface of the lower plate part 161 is fixed to the radar device 11 with screws 164. The connecting part 162 allows the lower plate part 161 to be rotatable about an axis that extends in the right-left direction relative to the travel direction of the vehicle 1. With this mechanism, it is possible to select the angle of the lower plate part 161 relative to the upper plate part 161.

The bracket 16 further includes an adjusting bolt 165 and a spring 166. The spring 166 gives the two plate parts 161 a force acting in such a direction that the two plate parts approach each other. The adjusting bolt 165 determines the position of the lower plate part 161 relative to the upper plate part 161. With this mechanism, the monitoring direction of the radar device 11 in the up-down direction is determined precisely. Alternatively, other various mechanisms may be employed, instead of the adjustment mechanism of the bracket 16 in FIG. 3. For example, a mechanism is conceivable in which a plurality of different types of brackets having different tilt angles between upper and lower surfaces are prepared, and a bracket having a suitable tilt angle is selected according to the required angle.

The radar device 11 includes an antenna part 21, a camera part 22, a circuit part 23, and a cover 24. The camera part 22 is located above the antenna part 21. The cover 24 covers the tops of the antenna part 21, the camera part 22, and the circuit part 23. The cover 24 is mounted on the antenna part 21. The camera part 22 is also mounted on the antenna part 21 via a member not shown. The arrangement of the antenna part 21, the camera part 22, and the circuit part 23 may be appropriately changed. For example, the camera part 22 may be located below or beside the antenna part 21. The cover 24 may cover the antenna part 21, the camera part 22, and the circuit part 23 in various forms. For example, the cover 24 may cover the whole of the antenna part 21, the camera part 22, and the circuit part 23, or may cover only the bottom of them.

Figure 4:
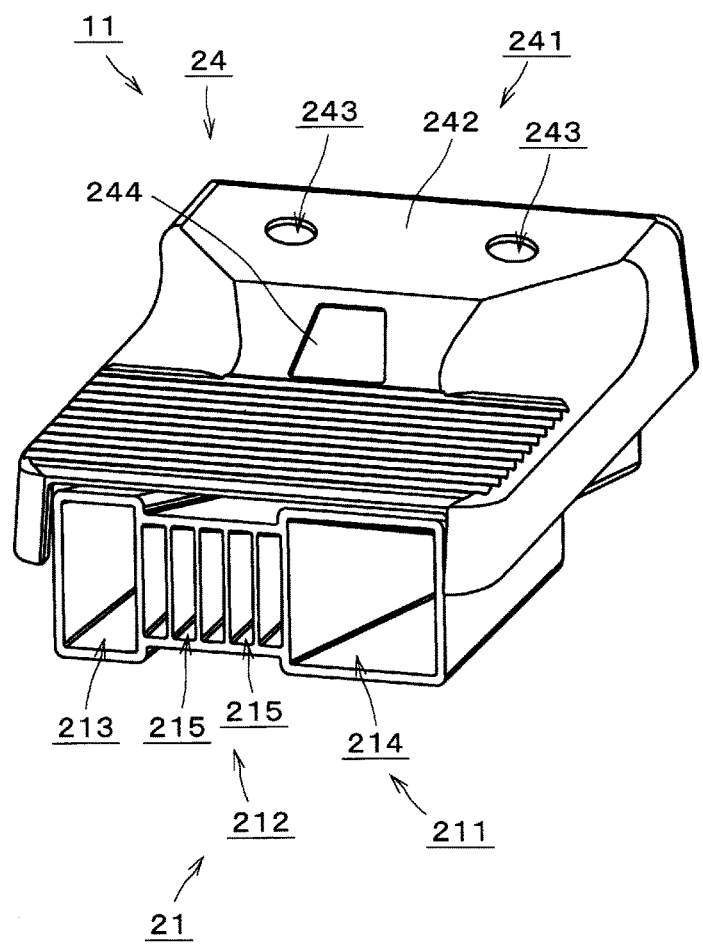
FIG. 4 is a perspective view of the radar device.

FIG. 4 is a perspective view of the radar device 11. The cover 24 has a mounting part 241 at the top, which is mounted on the bracket 16. The mounting part 241 includes a flat surface 242 and mounting holes 243. The flat surface 242 is in contact with the lower plate part 161 of the bracket 16. The mounting holes 243 have the screws 164 in them.

As illustrated in FIG. 3, the circuit part 23 includes a circuit board 23a that is mounted on the antenna part 21, and a circuit board 23b that is connected to the camera part 22. The circuit boards 23a and 23b are electrically connected to each other. The circuit board 23a primarily processes signals received from the antenna part 21, and the circuit board 23b primarily processes signals received from the camera part 22, but this sharing of functions may be appropriately changed.

The antenna part 21 transmits a radio wave, which is a radar wave, to outside the vehicle through the laminated glass 12 and receives a received wave through the laminated glass 12, the received wave being a reflected wave from the outside. That is, the antenna part 21 transmits a transmission wave from inside the innermost glass layer 121 to outside the outermost glass layer 122 and receives a reflected wave that enters inside the innermost glass layer 121 from outside the outermost glass layer 122.

As illustrated in FIG. 4, the antenna part 21 includes a transmitting antenna part 211 and a receiving antenna part 212. The transmitting antenna part 211 transmits transmission waves. The receiving antenna part 212 receives reflected waves resulting from the transmission waves. The transmitting antenna part 211 includes a first transmitting antenna 213 and a second transmitting antenna 214. The first transmitting antenna 213 and the second transmitting antenna 214 are horn antennas. The horns of the first transmitting antenna 213 and the second transmitting antenna 214 have the same height in the up-down direction. The horn of the first transmitting antenna 213 has a smaller lateral width than the lateral width of the horn of the second transmitting antenna 214. Thus, the first transmitting antenna 213 transmits a first transmission wave that has a wide radiation range, and the second transmitting antenna 214 transmits a second transmission wave that has a different radiation pattern from the first transmission wave and has a narrower radiation range than the radiation range of the first transmission wave. That is, the transmitting antenna part 211 can transmit both the first transmission wave and the second transmission wave.

The receiving antenna part 212 includes five receiving antennas 215. The receiving antennas 215 are arranged in the lateral direction. Each receiving antenna 215 is a horn antenna. That is, every antenna included in the antenna part 21 is a horn antenna. The horns of the receiving antennas 215 have the same shape. Note that the "longitudinal direction" and the "lateral direction" as used herein respectively refer to a longitudinal direction and a lateral direction that are defined in the design of the vehicle 1, and respectively do not need to be exactly parallel to and perpendicular to the direction of gravity.

In each horn antenna of the antenna part 21, constituents are electrically or spatially connected for transmitting and receiving signals in the order of a monolithic microwave integrated circuit (MMIC), a transmission line (specifically, a microstrip line, a transducer, and a waveguide), and a horn. Using the horn antenna allows gains to be secured while minimizing the width in the height direction of the antenna, and allows the forward projection area of the radar device 11 to be reduced. Thus, the radar device 11 can be installed in the vicinity of the windshield without limiting the vision of passengers.

As illustrated in FIG. 3, the radar device 11 further includes an antenna cover 25. The antenna cover 25 is not shown in FIG. 4. The antenna cover 25 is located between the laminated glass 12 and the antenna part 21 and covers the front of the antenna part 21. The antenna cover 25 is molded of a resin. The front surface, i.e., outer surface, of the antenna cover 25 is black in color. This prevents the antenna part 21 from standing out when viewed from the outside of the vehicle, and ensures the aesthetic appearance of the vehicle 1. The antenna cover 25 is inclined approximately 10 degrees from the vertical direction to the direction of transmission of a transmission wave.

The camera part 22 includes a two-dimensional image sensor. The camera part 22 observes the outside from inside the laminated glass 12. In other words, the camera part 22 observes the outside of the vehicle from the vehicle interior 13. As illustrated in FIGS. 3 and 4, the cover 24 includes a camera window 244. The camera window 244 is transparent.

The camera part 22 observes the outside of the vehicle through the camera window 244 and the laminated glass 12.

Figure 5:
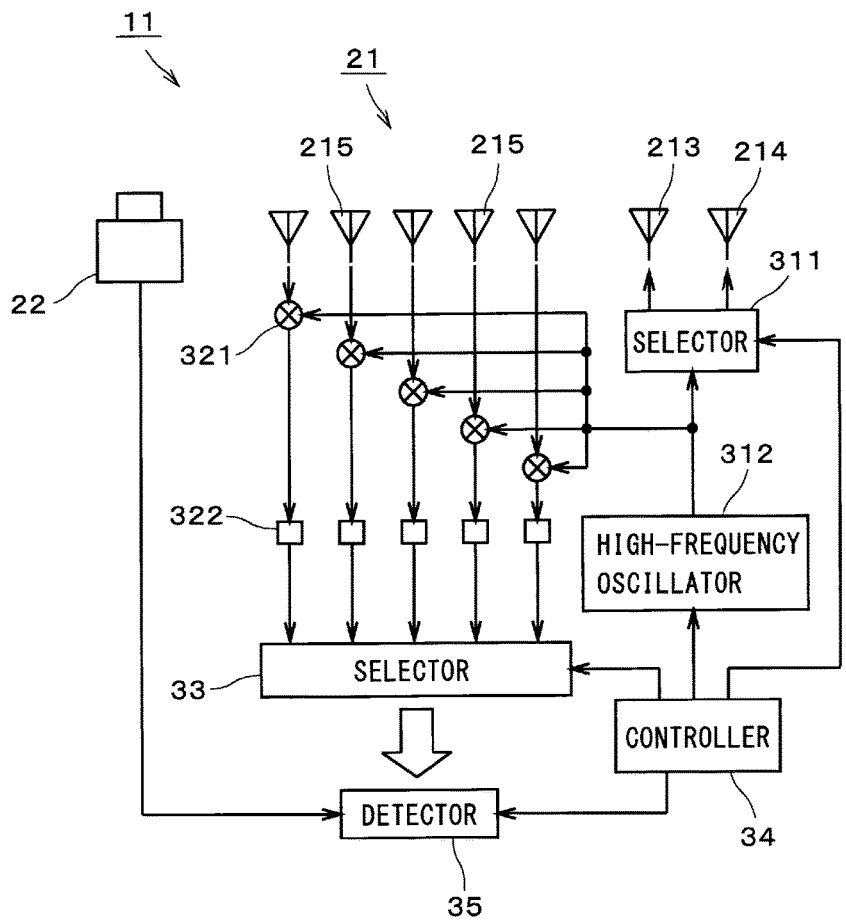
FIG. 5 is a block diagram illustrating an outline of a configuration of the radar device.

FIG. 5 is a block diagram illustrating an outline of a configuration of the radar device 11. The first transmitting antenna 213 and the second transmitting antenna 214 are connected to a selector 311. The selector 311 is connected to a high-frequency oscillator 312. This allows the high-frequency oscillator 312 to switch connection between the first transmitting antenna 213 and the second transmitting antenna 214 and to supply high-frequency electric power to either the first transmitting antenna 213 or the second transmitting antenna 214. That is, the transmission wave is switched between the first transmission wave and the second transmission wave. In the present embodiment, a frequency-modulated continuous wave (FMCW) system that uses a relatively narrow frequency band is employed, and the frequency of the high-frequency signal received from the high-frequency oscillator 312 fluctuates.

Each of the five receiving antennas 215 is connected to a mixer 321 and an AD converter 322 in the stated order. The AD converter 322 is connected to a selector 33. The receiving antenna 215 receives input of a reflected wave generated by reflection of a transmission wave on an external object. A signal of the reflected wave received by the receiving antenna 215 and a circuit associated therewith is input to the mixer 321. The mixer 321 also receives input of a signal from the high-frequency oscillator 312 and combines the received signals to acquire a beat signal that indicates a difference in frequency between the transmission wave and the reflected wave. The beat signal is converted into a digital signal by the AD converter 322 and input to the selector 33.

The selector 33 selects at least one or more of the five beat signals and inputs the selected signal(s) to a detector 35. The detector 35 obtains, for example, the position and speed of the object by converting the beat signal(s) through Fourier transformation and further performing arithmetic processing on the signal(s). Meanwhile, the detector 35 also receives input of an image signal from the camera part 22. Using the information received from the antenna part 21 and the camera part 22, the detector 35 detects the type and condition of the object with higher precision.

The selector 311, the high-frequency oscillator 312, the selector 33, and the detector 35 are connected to a controller 34. The controller 34 controls these constituent elements to implement the detection operation of the detector 35. The controller 34 and the detector 35 are provided in the circuit part 23.

Figure 6A:
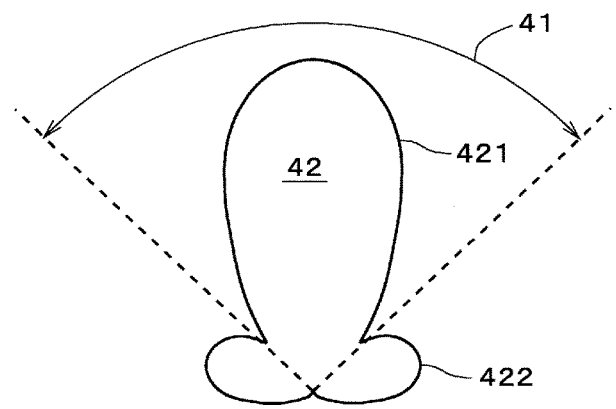
FIG. 6A illustrates a near-field monitoring mode.
Figure 6B:
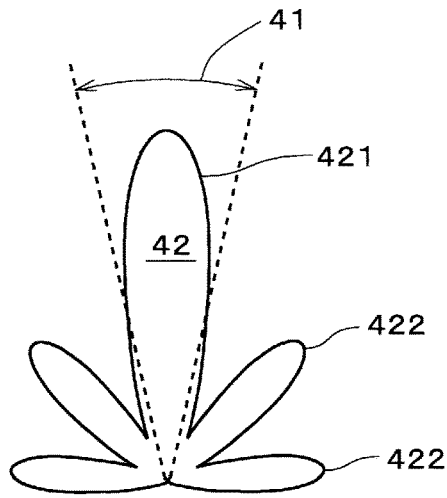
FIG. 6B illustrates a far-field monitoring mode.

Operations of the controller 34 includes a near-field monitoring mode and a far-field monitoring mode. FIG. 6A illustrates the near-field monitoring mode, and FIG. 6B illustrates the far-field monitoring mode. In FIGS. 6A and 6B, the bottom side corresponds to the antenna side, and the top side corresponds to the forward side of the vehicle 1. A range 41 indicates a radiation range of a transmission wave. The first transmitting antenna 213 and the second transmitting antenna 214 have side lobes that are sufficiently smaller than the main lobe. A pattern 42 indicates an antenna pattern of the receiving antenna part 212. Reference numeral 421 indicates the main lobe, and reference numeral 422 indicates side lobes other than the main lobe 421.

In the near-field monitoring mode, the first transmission wave is transmitted from the first transmitting antenna 213 under the control of the controller 34 controlling the selector 311. Meanwhile, signals derived from the five receiving antennas 215 are input to the detector 35 under the control of the controller 34 controlling the selector 33. Using the signals from the five receiving antennas 215, which are arranged at narrow intervals, increases the spread of the main lobe 421 of the receiving antenna part 212 and, on the other hand, suppresses the spread of the side lobes 422. As a result, in the near-field monitoring mode, the azimuth resolution is lower and the effective azimuth detection range is wider than in the far-field monitoring mode, which will be described later. As described previously, the first transmission wave has a wider radiation range 41 than the second transmission wave. Thus, the near-field monitoring mode achieves a wide range of detection of objects.

In the far-field monitoring mode, the second transmission wave is transmitted from the second transmitting antenna 214 under the control of the controller 34 controlling the selector 311. Meanwhile, signals derived from only three of the five receiving antennas 215, namely, the leftmost, central, and rightmost receiving antennas 215, are input to the detector 35 under the control of the controller 34 controlling the selector 33. Using only the signals from the three receiving antennas 215, which are arranged at wide intervals, reduces the spread of the main lobe 421 of the receiving antenna part 212 and, on the other hand, increases the spread of the side lobes 422.

However, the second transmission wave is not emitted in the directions of the side lobes 422 as illustrated in FIG. 6B because the second transmission wave has a narrow radiation range 41. In other words, in order to detect objects that are located far in front of the vehicle, a radio wave is not emitted in such directions that deviate from the front side of the vehicle and thus do not need monitoring. This allows the main lobe 421 to detect a reflected wave while suppressing the influence of the side lobes 422. In the far-field monitoring mode, the azimuth resolution is high, and the effective azimuth detection range is narrow. Thus, the far-field monitoring mode achieves a distant and narrow range of detection of objects.

As described above, the radar device 11 implements two modes of operation by the controller 34 controlling constituent elements including the transmitting antenna part 211 and the receiving antenna part 212. The radar device 11 uses conditions peculiar to vehicles, that the receiving antenna part 212 changes the range of the main lobe, and there is no need in the far-field monitoring mode to increase the resolution in all directions. This reduces the manufacturing cost of the radar device 11 while achieving both near- and far-field monitoring. The radar device 11 implements proper near- and far-field monitoring at low cost by including a plurality of receiving antennas 215 used in the far-field monitoring mode in a plurality of receiving antennas 215 used in the near-field monitoring mode.

The antenna pattern of the receiving antenna part 212 may be changed by the selector 33 performing weighing on the signals received from the receiving antennas 215. Moreover, the selection of signals from the receiving antennas 215 may be implemented by providing a mechanism for turning on and off the receiving functions themselves of the receiving antennas 215, instead of using the selector 33. In this case, this mechanism for turning on and off the receiving functions serves as a selector.

The near-field monitoring mode and the far-field monitoring mode are switched at high speed. That is, the first transmission wave and the second transmission wave are alternately transmitted under the control of the controller 34. In actuality, in order to avoid needless transmission of a radio wave during arithmetic processing, a transmission stop period between the first transmission wave and the second transmission wave is longer than both of the transmission period of the first transmission wave and the transmission period of the second transmission wave. For example, a single transmission period of a transmission wave is 2 milliseconds, and the transmission interval is 50 milliseconds.

The number of receiving antennas 215 arranged at equal intervals in the lateral direction is not limited to five, and the antenna part 21 may include six or more receiving antennas 215. Including five or more receiving antennas 215 makes it possible to use signals from three or more receiving antennas 215 arranged at wide intervals, even after the thinning-out of the receiving antennas 215 to be used, and to thereby grasp the position of an object that is located far away. If there is only one object to be detected, the number of receiving antennas 215 that remain after the thinning-out may be two. Thus, the minimum number of receiving antennas 215 in the radar device 11 is three.

If there is no need to detect the position of an object in the near-field monitoring mode, the number of receiving antennas 215 that are used in the near-field monitoring mode may be two. For example, a configuration is conceivable in which three receiving antennas 215 are arranged at equal intervals so that signals from two adjacent receiving antennas 215 are used in the near-field monitoring mode, and signals from two receiving antennas 215 located on both sides are used in the far-field monitoring mode.

More generally, in the near-field monitoring mode, the first transmission wave is transmitted from the transmitting antenna part 211, and among the plurality of receiving antennas 215, signals from two or more receiving antennas 215 arranged at narrow intervals are used. In the far-field monitoring mode, the second transmission wave is transmitted from the transmitting antenna part 211, and among the plurality of receiving antennas 215, signals from two or more receiving antennas 215 arranged at wide intervals are used. In order to reduce the number of receiving antennas 215, at least one of the two or more receiving antennas 215 arranged at wide intervals is included in the two or more receiving antennas arranged at narrow intervals.

The first and second transmission waves are vertically polarized waves with respect to the lateral direction. The first and second transmission waves do not need to be completely vertically polarized waves, and may be diagonally or elliptically polarized waves. More generally, the first and second transmission waves have a vertical polarization component greater than the horizontal polarization component thereof with respect to the lateral direction. Since the laminated glass 12 is usually inclined with its upper part located rearward of its lower part, the vertical polarization components of the first and second transmission waves with respect to the lateral direction are vertical polarization components thereof with respect to the laminated glass 12. Thus, the efficiency of the transmission waves passing through the laminated glass 12 improves. In particular, the efficiency of detection by the radar device 11 improves if the incident angles of the first and second transmission waves on the laminated glass 12 are close to the Brewster angle on the inner surface of the laminated glass 12. Note that the vertically polarized wave is also called a transverse magnetic wave (TM wave) that indicates a polarized wave having an electric-field component perpendicular to the plane of reflection. At this time, the magnetic-field component thereof is parallel to the plane of reflection. The horizontally polarized wave is also called a transverse electric wave (TE wave) that indicates a polarized wave having a magnetic-field component perpendicular to the plane of reflection. At this time, the electric-field component thereof is parallel to the plane of reflection. As will be described later, the first transmission wave and the second transmission wave may have a horizontal polarization component greater than the vertical polarization component thereof.

The horns of the first transmitting antenna 213 and the second transmitting antenna 214 are arranged in the lateral direction. In the present embodiment, the first transmitting antenna 213 and the second transmitting antenna 214 are located on the right and left sides of the receiving antenna part 212. By arranging the first transmitting antenna 213, the second transmitting antenna 214, and the receiving antenna 215 side by side, it is possible to house a plurality of horns in a single member and to thereby reduce the manufacturing cost of the radar device 11. Additionally, the orientation of each horn can be readily and accurately determined at the time of installing the radar device 11. In particular, by arranging the horns of the first transmitting antenna 213 and the second transmitting antenna 214 in the lateral direction, it is possible to accurately align the orientations of the first transmitting antenna 213 and the second transmitting antenna 214 in the up-down direction.

The first transmitting antenna 213 and the second transmitting antenna 214 are preferably disposed such that the direction of the center of the main lobe, i.e., the direction of the peak of the main lobe, is oriented in the horizontal direction. The first transmitting antenna 213 and the second transmitting antenna 214 may be disposed such that the direction of the main lobe is oriented in a direction that is between the horizontal direction and a direction inclined two degrees downward from the horizontal direction.

The first transmitting antenna 213, the second transmitting antenna 214, and the receiving antennas 215 may be antennas other than horn antennas. They may be any type of antenna that can transmit and receive millimeter waves. Examples of such antennas include lens antennas, low-cost printed antennas, microstrip antennas, and slit antennas. Every antenna included in the antenna part 21 does not need to be of the same type, and different types of antennas may be mixed.

Figure 7:
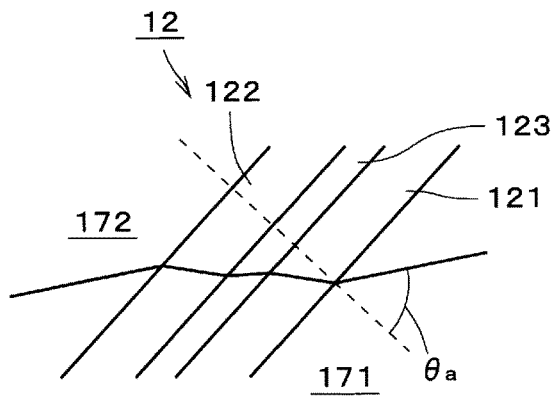
FIG. 7 illustrates how a transmission wave enters the laminated glass.

Next is a description of the laminated glass 12 when the radar device 11 is provided in the vehicle interior. FIG. 7 illustrates how a transmission wave enters the laminated glass 12. Note that the incident angle of the transmission wave indicates an incident angle of the transmission wave on an object at the center of the main lobe of the transmitting antenna (i.e., the first transmitting antenna 213 and the second transmitting antenna 214) when the mounting part 241 is mounted on the bracket 16.

Part of the transmission wave that enters the laminated glass 12 will be reflected at the boundary between the innermost glass layer 121 and an air layer 171 on the vehicle interior 13 side of the innermost glass layer 121, at the boundary between the innermost glass layer 121 and the intermediate resin layer 123, at the boundary between the intermediate resin layer 123 and the outermost glass layer 122, and at the boundary between the outermost glass layer 122 and an air layer 172 on the vehicle exterior side of the outermost glass layer 122 when sequentially passing through the innermost glass layer 121, the intermediate resin layer 123, and the outermost glass layer 122. Hereinafter, the air layer 171 is referred to as an "inner air layer," and the air layer 172 is referred to as an "outer air layer."

Focusing now on three layers that are in contact with one another and selected from among the inner air layer 171, the innermost glass layer 121, the intermediate resin layer 123, the outermost glass layer 122, and the outer air layer 172, the three layers may be selected as desired as long as they are in contact with one another. The three layers are respectively referred to as a "first layer 51," a "second layer 52," and a "third layer 53" in the order from the vehicle interior 13 side to outside, i.e., in the order from the innermost layer.

Figure 8:
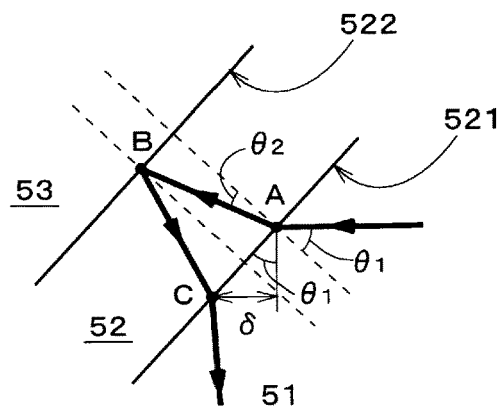
FIG. 8 is a cross-sectional view illustrating reflection of the transmission wave.

FIG. 8 schematically illustrates the three layers 51, 52, and 53. As indicated by bold arrows in FIG. 8, part of the transmission wave that enters the second layer 52 from a point A on an interface 521 between the first layer 51 and the second layer 52 is reflected at a point B on an interface 522 between the second layer 52 and the third layer 53 and returns as a reflected wave to a point C on the interface 521. At this time, if the reflected wave passing through the point C and a reflected wave generated by reflection of the transmission wave that enters the point C on the interface 521 from the antenna part 21 side are opposite in phase (i.e., the phases of the reflected waves are shifted by π), they will cancel out each other. As a result, the transmission wave component reflected on the second layer 52 will decrease. In other words, apparent reflection of the transmission wave that enters the interface 521 from the first layer 51 side, which is adjacent to the surface of the second layer 52, will be suppressed.

The following describes the second layer 52 that suppresses reflection of a transmission wave by interference between a reflected wave generated by reflection of the transmission wave on the interface 522 and a reflected wave generated by reflection of a transmission wave on the interface 521. In the following description, $n_1$ is the refractive index of the first layer 51, $n_2$ is the refractive index of the second layer 52, $n_3$ is the refractive index of the third layer 53, $d_2$ is the thickness of the middle, i.e., second layer 52, $\theta_1$ is the incident angle of the transmission wave on the second layer 52, and $\theta_2$ is the refraction angle in the second layer 52. Formula 5 holds true according to Snell's law.

$$\frac{\sin\theta_1}{\sin\theta_2} = \frac{n_2}{n_1} \quad \text{[Formula 5]}$$

An optical path length $L_{abc}$ from the point A via the point B to the point C in the second layer 52 is expressed by Formula 6.

$$L_{abc} = \frac{2d_2 n_2}{\cos\theta_2} \quad \text{[Formula 6]}$$

An optical path length δ between the point A and the point C in the travel direction of the transmission wave entering the second layer 52 from the antenna part 21 is expressed by Formula 7.

$$\delta = 2d_2 n_1 \tan\theta_2 \sin\theta_1 \quad \text{[Formula 7]}$$

The condition under which the reflected wave generated by reflection of the transmission wave on the interface 522 and the reflected wave generated by reflection of the transmission wave on the interface 521 will be opposite in phase on the interface 521 is expressed by Formula 8, where N is an integer of 0 or more, and λ is the wavelength of the transmission wave in the air. Formula 8 is based on the assumption that the phases are inverted (i.e., the phases are shifted by π) by the reflection of the transmission wave on the point B and the reflection of the transmission wave that enters the point C from the adjacent layer, respectively.

$$L_{abc} = \frac{\lambda}{2}(2N+1) + \delta \quad \text{[Formula 8]}$$

Transforming Formula 8 by using Formulas 5 to 7 yields Formula 9 that expresses the thickness $d_2$ of the second layer 52.

$$d_2 = \frac{(2N+1)n_2\lambda\cos\left(\sin^{-1}\left(\frac{n_1}{n_2}\sin\theta_1\right)\right)}{4(n_2^2 - n_1^2\sin^2\theta_1)} \quad \text{[Formula 9]}$$

Meanwhile, Formula 10 holds true according to Snell's law, where the refractive index of the air layer is assumed to be 1, and $\theta_a$ is the incident angle of the transmission wave on the innermost glass layer 121 from the inner air layer 171 as illustrated in FIG. 7. Thus, Formula 9 is expressed as Formula 11. Note that the incident angle $\theta_a$ is also an angle formed by the normal to the laminated glass 12 and the direction of propagation of the transmission wave at the center of the main lobe of the transmitting antenna.

$$n_1 \sin\theta_1 = \sin\theta_a \quad \text{[Formula 10]}$$

$$d_2 = \frac{(2N+1)n_2\lambda\cos\left(\sin^{-1}\left(\frac{1}{n_2}\sin\theta_a\right)\right)}{4(n_2^2 - n_1^2\sin^2\theta_a)} \quad \text{[Formula 11]}$$

If the phase shift between the reflected wave generated by reflection of the transmission wave on the interface 522 and the reflected wave generated by reflection of the transmission wave on the interface 521 is within a range of (π±π/4), it is considered possible to suppress the reflection of the transmission wave on the second layer 52. In this case, (2N+1) in Formula 11 is in the range of (2N+1±¼). Accordingly, a preferable condition for the thickness $d_2$ of the second layer 52 is expressed by Formula 12.

$$\frac{\left(2N+\frac{3}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N+\frac{5}{4}\right)n_2\lambda\cos\left(\sin^{-1}\left(\frac{1}{n_2}\sin\theta_a\right)\right)}{4(n_2^2 - \sin^2\theta_a)} \quad \text{[Formula 12]}$$

The above condition is based on the assumption that the incident angle $\theta_1$ of the transmission wave on the second layer 52 is less than or equal to a Brewster angle in the case where a radio wave enters the interface 521 of the second layer 52 from the first layer 51. As described previously, the transmission wave has a vertical polarization component greater than the horizontal polarization component thereof with respect to the laminated glass 12. Thus, if the incident angle $\theta_1$ is greater than the Brewster angle, the influence of the phase inversion of the vertical polarization component reflected on the interface 521 will increase. In this case, the condition under which the reflected wave generated by reflection of the transmission wave on the interface 522 and the reflected wave generated by reflection of the transmission wave on the interface 521 will be opposite in phase on the interface 521 is expressed by Formula 13, and a preferable condition for the thickness $d_2$ of the second layer 52 is expressed by Formula 14.

$$L_{abc} = \lambda(N+1) + \delta \quad \text{[Formula 13]}$$

$$\frac{\left(2N + \frac{7}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N + \frac{9}{4}\right)n_2\lambda\cos\left(\sin^{-1}\left(\frac{1}{n_2}\sin\theta_a\right)\right)}{4(n_2^2 - \sin^2\theta_a)} \quad \text{[Formula 14]}$$

A Brewster angle $\theta_{b1}$ in the case where a radio wave enters the second layer 52 from the first layer 51 is $\tan^{-1}(n_2/n_1)$. At this time, the incident angle $\theta_a$ on the innermost glass layer 121 is expressed by Formula 15 using Formula 10.

$$\sin^{-1}\left(n_1\sin\left(\tan^{-1}\frac{n_2}{n_1}\right)\right) \quad \text{[Formula 15]}$$

Similarly, a Brewster angle $\theta_{b2}$ in the case where a radio wave enters the third layer 53 from the second layer 52 is $\tan^{-1}(n_3/n_2)$. At this time, the incident angle $\theta_a$ on the innermost glass layer 121 is expressed by Formula 16.

$$\sin^{-1}\left(n_2\sin\left(\tan^{-1}\frac{n_3}{n_2}\right)\right) \quad \text{[Formula 16]}$$

If the incident angle $\theta_a$ on the innermost glass layer 121 is smaller than both of the angles given by Formulas 15 and 16, both of the reflected wave generated by reflection of the transmission wave on the interface 522 and the reflected wave generated by reflection of the transmission wave on the interface 521 will not undergo a phase inversion due to the relationship with the Brewster angles $\theta_{b1}$ and $\theta_{b2}$. If the incident angle $\theta_a$ is greater than both of the angles given by Formulas 15 and 16, both of the reflected wave generated by reflection of the transmission wave on the interface 522 and the reflected wave generated by reflection of the transmission wave on the interface 521 will undergo a phase inversion due to the relationship with the Brewster angles $\theta_{b1}$ and $\theta_{b2}$. If the incident angle $\theta_a$ is a value between or equal to one of the angles given by Formulas 15 and 16, only one of the reflected wave generated by reflection of the transmission wave on the interface 522 and the reflected wave generated by reflection of the transmission wave on the interface 521 will undergo a phase inversion due to the relationship with the Brewster angles $\theta_{b1}$ and $\theta_{b2}$.

If the refractive index $n_2$ of the second layer 52 is higher than the refractive index $n_1$ of the first layer 51, the reflected wave generated by reflection of the transmission wave on the interface 521 will undergo a phase inversion due to a difference in the refractive index. If the refractive index $n_3$ of the third layer 53 is higher than the refractive index $n_2$ of the second layer 52, the reflected wave generated by reflection of the transmission wave on the interface 522 will undergo a phase inversion due to a difference in the refractive index. Accordingly, the reflection of the transmission wave on the interface 521 will be suppressed if the thickness $d_2$ of the second layer 52 satisfies the relationships expressed by Formulas 17 and 18.

If $n_1 < n_2 < n_3$ or $n_1 > n_2 >$ [Formula 17]
$n_3$ and $\theta_a$ is smaller than or greater than both of
$$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N + \frac{3}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N + \frac{5}{4}\right)n_2\lambda\cos\left(\sin^{-1}\left(\frac{1}{n_2}\sin\theta_a\right)\right)}{4(n_2^2 - \sin^2\theta_a)},$$

and if $n_1 < n_2 < n_3$ or $n_1 > n_2 >$
$n_3$ and $\theta_a$ is value between or equal to one of
$$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N + \frac{7}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N + \frac{9}{4}\right)n_2\lambda\cos\left(\sin^{-1}\left(\frac{1}{n_2}\sin\theta_a\right)\right)}{4(n_2^2 - \sin^2\theta_a)}$$

If $n_1 > n_2 < n_3$ or $n_1 < n_2 >$ [Formula 18]
$n_3$ and $\theta_a$ is smaller than or greater than both of
$$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N + \frac{7}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N + \frac{9}{4}\right)n_2\lambda\cos\left(\sin^{-1}\left(\frac{1}{n_2}\sin\theta_a\right)\right)}{4(n_2^2 - \sin^2\theta_a)},$$

and if $n_1 > n_2 < n_3$ or $n_1 < n_2 >$
$n_3$ and $\theta_a$ is a value between or equal to one of
$$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N + \frac{3}{4}\right)n_2\lambda\cos\left(\sin^{-1}\left(\frac{1}{n_2}\sin\theta_a\right)\right)}{4(n_2^2 - \sin^2\theta_a)} \leq$$

$$d_2 \leq \frac{\left(2N + \frac{5}{4}\right)n_2\lambda\cos\left(\sin^{-1}\left(\frac{1}{n_2}\sin\theta_a\right)\right)}{4(n_2^2 - \sin^2\theta_a)}$$

If the phase shift between the reflected wave generated by reflection of the transmission wave on the interface 522 and the reflected wave generated by reflection of the transmission wave on the interface 521 is within a range of $(\pi \pm \pi/6)$, the reflection of the transmission wave will more reliably be suppressed. In this case, Formulas 17 and 18 are respectively expressed by Formulas 19 and 20.

If $n_1 < n_2 < n_3$ or $n_1 > n_2 >$ [Formula 19]
$n_3$ and $\theta_a$ is smaller than or greater than both of
$$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

-continued $$\frac{\left(2N+\frac{5}{6}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{7}{6}\right)n_2\lambda\cos\left(\sin^{-1}\left(\frac{1}{n_2}\sin\theta_a\right)\right)}{4(n_2^2-\sin^2\theta_a)},$$

and if $n_1 < n_2 < n_3$ or $n_1 > n_2 > n_3$ and $\theta_a$ is value between or equal to one of $$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N+\frac{11}{6}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{13}{6}\right)n_2\lambda\cos\left(\sin^{-1}\left(\frac{1}{n_2}\sin\theta_a\right)\right)}{4(n_2^2-\sin^2\theta_a)}$$

If $n_1 > n_2 < n_3$ or $n_1 < n_2 >$ [Formula 20]
$n_3$ and $\theta_a$ is smaller than or greater than both of $$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N+\frac{11}{6}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{13}{6}\right)n_2\lambda\cos\left(\sin^{-1}\left(\frac{1}{n_2}\sin\theta_a\right)\right)}{4(n_2^2-\sin^2\theta_a)},$$

and if $n_1 > n_2 < n_3$ or $n_1 < n_2 >$
$n_3$ and $\theta_a$ is a value between or equal to one of $$\sin^{-1}\left(n_1\sin\left(\tan^{-1}\frac{n_2}{n_1}\right)\right) \text{ and } \sin^{-1}\left(n_2\sin\left(\tan^{-1}\frac{n_3}{n_2}\right)\right),$$

$$\frac{\left(2N+\frac{5}{6}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{7}{6}\right)n_2\lambda\cos\left(\sin^{-1}\left(\frac{1}{n_2}\sin\theta_a\right)\right)}{4(n_2^2-\sin^2\theta_a)}$$

The vertical polarization that enters an object at the Brewster angle is ideally guided into the object without reflection. However, in the case of the laminated glass 12, even if the vertical polarization enters the innermost glass layer 121 at the Brewster angle or an angle close to the Brewster angle, the vertical polarization will not always enter the outermost glass layer 122 at an ideal angle. This phenomenon becomes a problem when the outermost glass layer 122 causes a considerable reduction in the efficiency of transmission of a radio wave. In this case, it is necessary to adjust the behavior of a radio wave within the outermost glass layer 122 while properly suppressing a reduction in the efficiency of transmission of the radio wave, caused by the presence of the innermost glass layer 121.

Accordingly, the above conditional expressions are in particular suited to the case where the incident angle $\theta_a$ on the innermost glass layer 121 is close to the Brewster angle $\theta_b$ in the case where the transmission wave enters the innermost glass layer 121 from the inner air layer 171, and the outermost glass layer 122 is used as the second layer 52. In general, the efficiency of vertical polarization incidence on glass will suddenly drop if the incident angle becomes greater than the Brewster angle $\theta_b$ in the inner surface of the innermost glass layer 121, and will gradually decrease if the incident angle becomes smaller than the Brewster angle $\theta_b$. Thus, if inside the innermost glass layer 121 is an air layer, the incident angle $\theta_a$ on the innermost glass layer 121 preferably satisfies Formula 21.

$$(\theta_b - 10°) \le \theta_a \le (\theta_b + 5°) \quad \text{[Formula 21]}$$

A preferable condition for the thickness $d_2$ of the second layer 52 described above is based on the assumption that the transmission wave has a vertical polarization component greater than the horizontal polarization component thereof with respect to the laminated glass 12. If the transmission wave has a horizontal polarization component greater than or equal to the vertical polarization component thereof with respect to the laminated glass 12, the influence of the phase inversion due to the relationship with the Brewster angles will decrease. Accordingly, the reflection of the transmission wave on the second layer 52 will be suppressed if the thickness $d_2$ of the second layer 52 satisfies the relationships expressed by Formulas 22 and 23. If the phase shift between the two reflected waves is within a range of $(\pi \pm \pi/6)$, Formulas 22 and 23 are changed in accordance with Formulas 19 and 20.

If $n_1 < n_2 < n_3$ or $n_1 > n_2 > n_3$, [Formula 22]

$$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)}$$

If $n_1 > n_2 < n_3$ or $n_1 < n_2 > n_3$, [Formula 23]

$$\frac{\left(2N+\frac{7}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{9}{4}\right)n_2\lambda\cos\left(\sin^{-1}\left(\frac{1}{n_2}\sin\theta_a\right)\right)}{4(n_2^2-\sin^2\theta_a)}$$

The innermost glass layer 121 and the outermost glass layer 122 preferably have the same thickness and the same refractive index. In this case, the design and manufacturing cost of the laminated glass 12 will be reduced.

As illustrated in FIG. 3, the antenna cover 25 is provided at the front of the horns of the antenna part 21. The antenna cover 25 is provided substantially perpendicular to the central axes of the horns. Thus, the transmission wave enters substantially perpendicular to the antenna cover 25 at the center of the main lobe. To be more specific, the antenna cover 25 is often designed to intersect with the center of the main lobe of the antenna at an angle that is greater than or equal to 70° and less than or equal to 110°.

In the case of suppressing the reflection of a radio wave on the antenna cover 25, the formulas given above are applicable, where the first layer 51 is an air layer located inward of the antenna cover 25, the second layer 52 is the antenna cover 25, and the third layer 53 is an air layer located outward of the antenna cover 25. Specifically, Formulas 17 and 18 are applied if the transmission wave has a vertical polarization component greater than the horizontal polarization component thereof with respect to the laminated glass 12, and Formulas 22 and 23 are applied if the transmission wave has a horizontal polarization component greater than the vertical polarization component thereof. The same also applies when a ⅙ wavelength shift is tolerable.

Accordingly, a reduction of the transmission wave in the antenna cover 25 will be suppressed, and a reduction in the efficiency of transmission and reception will also be suppressed.

As the inventor of the present invention has deduced from the observation of electromagnetic waves in the millimeter waveband, the refractive indices of electromagnetic waves in the millimeter waveband differ greatly from those in the other frequency bands. Thus, the reflective indices of radio waves in the millimeter waveband have to be used to evaluate the formulas described above. The "radio waves in the millimeter waveband" as used herein refer to radio waves having wavelengths of 1 mm to 10 mm in the air.

Figure 9:
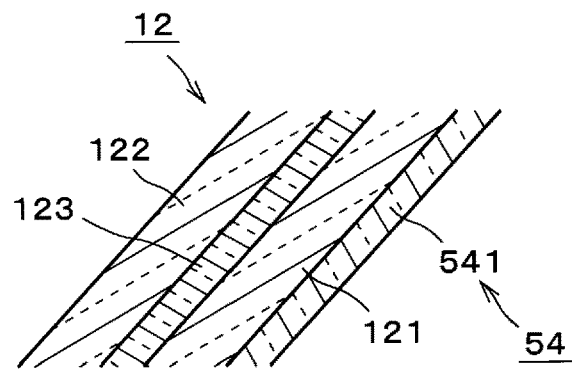
FIG. 9 is a cross-sectional view of the laminated glass and a reflection suppression layer.

FIG. 9 shows an example in which a reflection suppression layer 54 is provided on the surface on the vehicle interior 13 side of the laminated glass 12. The laminated glass 12 may have other structures as long as the surface on the vehicle interior 13 side is a surface of a glass layer, i.e., at least the surface on the vehicle interior 13 side is a surface of covering glass. The reflection suppression layer 54 includes a sheet-like dielectric layer 541. The details of the dielectric layer 541 will be described later.

Figure 10:
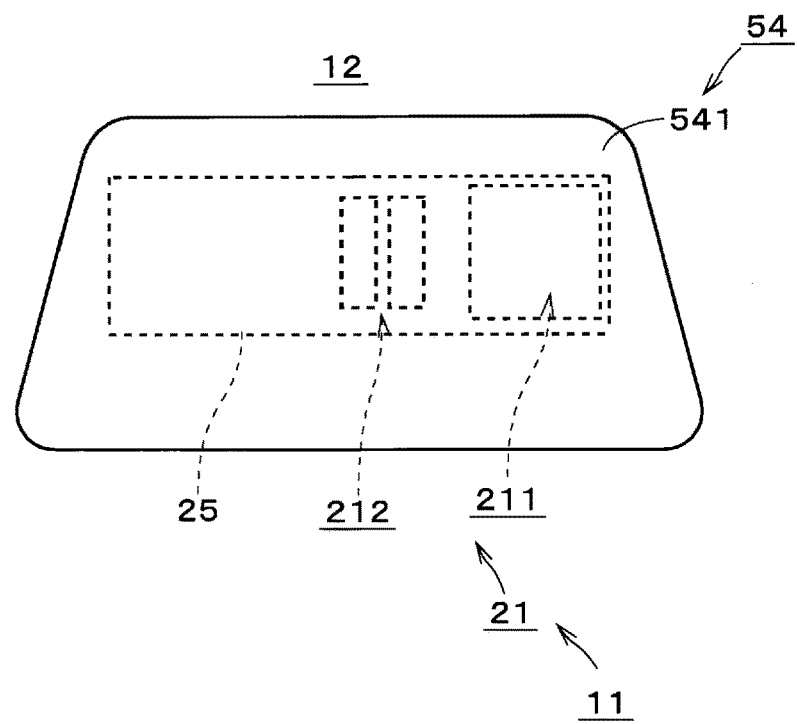
FIG. 10 is a front view of the reflection suppression layer.
Figure 11:
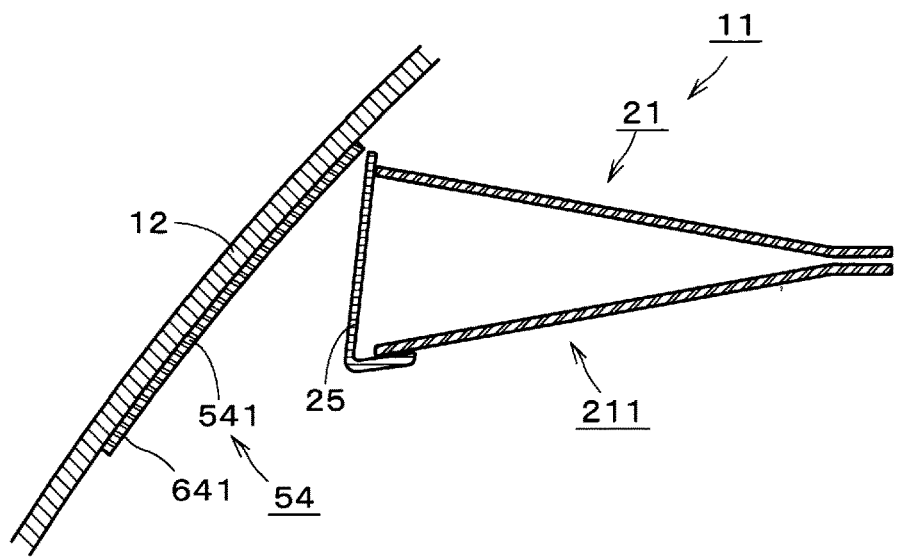
FIG. 11 is a cross-sectional view of the radar device, the laminated glass, and the reflection suppression layer.

FIGS. 10 and 11 illustrate part of the radar device 11 mounted on the laminated glass 12 and the reflection suppression layer 54. The radar device 11 is simplified in FIGS. 10 and 11. In FIGS. 10 and 11, constituent elements that are identical to those illustrated in FIGS. 3 to 5 are given by the same reference numerals. FIG. 10 illustrates the vehicle interior 13 as viewed from the front side of the laminated glass 12. In the antenna part 21, one single transmitting antenna is illustrated as the transmitting antenna part 211, and two receiving antennas are illustrated as the receiving antenna part 212. FIG. 11 illustrates cross-sections of the radar device 11, the laminated glass 12, and the reflection suppression layer 54 that are approximately perpendicular to the laminated glass 12. In FIG. 11, the laminated glass 12 is illustrated as a single layer without distinguishing among the innermost glass layer 121, the intermediate resin layer 123, and the outermost glass layer 122 illustrated in FIG. 9.

The dielectric layer 541 is bonded to the surface on the vehicle interior 13 side of the laminated glass 12, i.e., the surface on the antenna part 21 side of the laminated glass 12, and closely adheres to that surface. The dielectric layer 541 covers only part of the laminated glass 12. The width of the dielectric layer 541 along the surface of the laminated glass 12 increases in the downward direction. The dielectric layer 541 is an amorphous resin sheet and made of, for example, denatured polyphenylene ether (PPE). The dielectric layer 541 may be made of other materials. The dielectric layer 541 is preferably transparent if the radar device 11 includes a camera. If there is no interference with the function of the radar device 11, the dielectric layer 541 may be opaque.

Here, the refractive index of the reflection suppression layer 54, i.e., the refractive index of the dielectric layer 541, is lower than the refractive index of the innermost glass layer 121 of the laminated glass 12 and higher than the refractive index of the air. Thus, the reflectivity of a surface 641 on the antenna part 21 side of the dielectric layer 541 will be reduced to some extent, as compared to the reflectivity of the surface on the antenna part 21 side of the laminated glass 12 on the condition that no dielectric layer 541 is provided with the laminated glass 12. The refractive index of the dielectric layer 541 may be adjusted by introducing air bubbles or other materials.

In the case of the dielectric layer 541 as well, the formulas given above, either Formulas 17 and 18 or Formulas 22 and 23, are applicable, where the first layer 51 is an air layer located inward, the second layer 52 is the dielectric layer 541, and the third layer 53 is the innermost glass layer 121. The same also applies to the case where a ⅙ wavelength shift is tolerable. Here, $\theta_a$ is the incident angle of the transmission wave on the reflection suppression layer 54 at the center of the main lobe of the transmitting antenna. Since the laminated glass 12 and the reflection suppression layer 54 are parallel to each other, i.e., they are inclined at the same angle, the incident angle $\theta_a$ is also an angle formed by the normal to the laminated glass 12 and the direction of propagation of the transmission wave at the center of the main lobe of the transmitting antenna.

Figure 12:
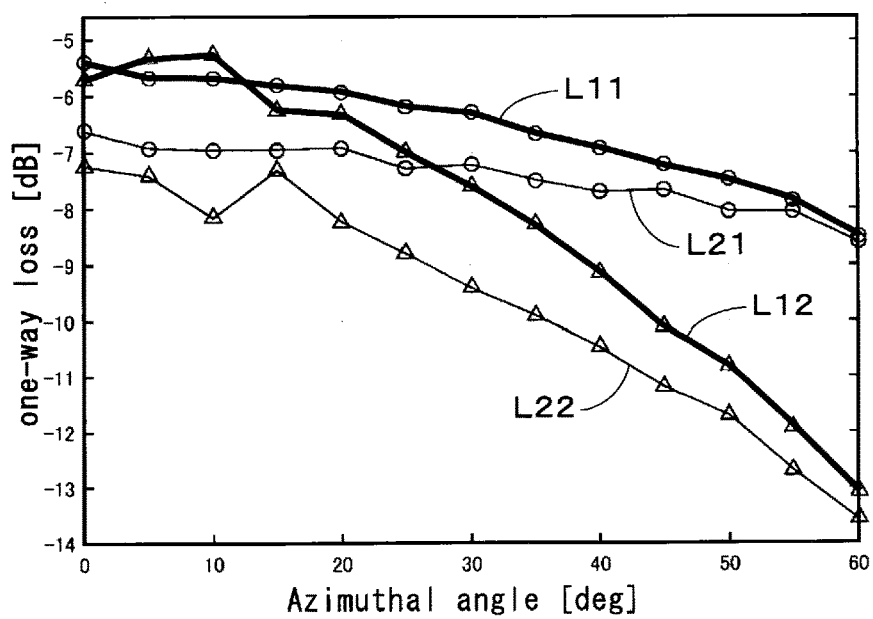
FIG. 12 illustrates the results of measuring loss of radio waves in the laminated glass.

FIG. 12 illustrates the results of measuring loss of radio waves due to the presence of the windshield. The vertical axis in FIG. 12 indicates one-way loss of radio waves travelling through the windshield to the outside, and the horizontal axis indicates the azimuthal angle. Bold lines L11 and L12 in FIG. 12 indicate loss due to the presence of the windshield with the dielectric layer 541, and fine lines L21 and L22 indicate loss due to the presence of the windshield without the dielectric layer 541. The lines L11 and L21 indicate the case where the incident angle is 55° when the azimuthal angle is 0°, and the lines L12 and L22 indicate the case where the incident angle is 85° when the azimuthal angle is 0°. Either incident angle is greater than the Brewster angle on the inner surface 641 of the dielectric layer 541, and the dielectric layer 541 has a thickness that satisfies the condition expressed by Formula 14.

As can be seen from FIG. 12, the presence of the dielectric layer 541 on the windshield reduces loss. In actuality, loss increases as the incident angle changes with increasing azimuthal angle, but the presence of the dielectric layer 541 on the windshield will suppress loss, regardless of the azimuthal angle. Alternatively, the thickness of the dielectric layer 541 may be gradually changed in accordance with the incident angle at each azimuthal angle. In this case, loss will be reduced considerably over the entire range of predetermined azimuthal angles. The front side of the radar device 11, i.e., when having an azimuthal angle of 0°, is required to have high sensitivity, whereas the sides thereof are not required to have such high sensitivity. From this viewpoint, there will be no problem if the dielectric layer 541 has a constant thickness.

As described above, the vehicle 1 includes the dielectric layer 541 located between the antenna part 21 and the laminated glass 12 and closely adhering to the surface of the laminated glass 12. The dielectric layer 541 has a refractive index that is lower than the refractive index of the innermost glass layer 121 of the laminated glass 12 and higher than the refractive index of the air. The dielectric layer 541 has a thickness that allows reflection of a transmission wave to be suppressed by interference between a reflected wave generated by reflection of the transmission wave on the interface at which the dielectric layer 541 closely adheres to the surface of the laminated glass 12, and a reflected wave generated by reflection of the transmission wave on the surface on the antenna part 21 side of the dielectric layer 541. This structure will help reduce loss of the transmission wave passing through the laminated glass 12 and improve the efficiency of transmission and reception of radio waves.

The incident angle of the transmission wave on the reflection suppression layer 54 at the center of the main lobe of the transmitting antenna is preferably greater than 10°. In other words, the laminated glass 12 may be inclined by a large amount with respect to the radiating surface of the transmitting antenna. Accordingly, the radar device 11 can be mounted on various parts of vehicles 1 in various designs.

Figure 13:
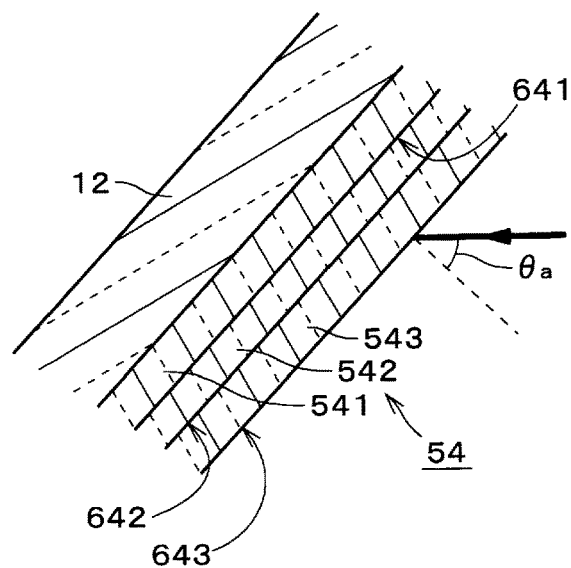
FIG. 13 is a cross-sectional view of a reflection suppression layer that includes a plurality of dielectric layers.

The reflection suppression layer 54 may include additional dielectric layers that closely adhere to the surface on the antenna part 21 side of the dielectric layer 541. In the example in FIG. 13, two dielectric layers 542 and 543 are stacked on top of each other on the surface 641 of the dielectric layer 541. Hereinafter, the dielectric layers 541, 542, and 543 are respectively referred to as an "outer dielectric layer 541," an "intermediate dielectric layer 542," and an "inner dielectric layer 543." The intermediate dielectric layer 542 closely adheres to the surface 641 on the antenna part 21 side of the outer dielectric layer 541. The refractive index of the intermediate dielectric layer 542 is preferably lower than the refractive index of the outer dielectric layer 541 and higher than the refractive index of the air. The inner dielectric layer 543 closely adheres to a surface 642 on the antenna part 21 side of the intermediate dielectric layer 542. The refractive index of the inner dielectric layer 543 is preferably lower than the refractive index of the intermediate dielectric layer 542 and higher than the refractive index of the air.

The reflection suppression layer 54 may include four or more dielectric layers. If the reflection suppression layer 54 includes a plurality of dielectric layers, the refractive indices of all dielectric layers are preferably lower than the refractive index of the innermost glass layer 121 of the laminated glass 12 and higher than the refractive index of the air. Additionally, the refractive indices of these dielectric layers are preferably set such that the dielectric layers located closer to the antenna part 21 have lower refractive indices.

In the case of each of the outer dielectric layer 541, the intermediate dielectric layer 542, and the inner dielectric layer 543 as well, the formulas given above, namely, either Formulas 17 and 18 or Formulas 22 and 23, are applicable, where the first layer 51 is a layer located inward of the dielectric layer, the second layer 52 is the dielectric layer, and the third layer 53 is a layer located outward of the dielectric layer. For example, the intermediate dielectric layer 542 has a thickness that allows reflection of a transmission wave to be suppressed by interference between a reflected wave generated by reflection of the transmission wave on the interface at which the intermediate dielectric layer 542 closely adheres to the outer dielectric layer 541, and a reflected wave generated by reflection of the transmission wave on the interface at which the intermediate dielectric layer 542 closely adheres to the inner dielectric layer 543. The inner dielectric layer 543 has a thickness that allows reflection of a transmission wave to be suppressed by interference between a reflected wave generated by reflection of the transmission wave on the interface at which the inner dielectric layer 543 closely adheres to the intermediate dielectric layer 542, and a reflected wave generated by reflection of the transmission wave on the surface on the antenna part 21 side of the inner dielectric layer 543.

More generally speaking, including the laminated glass 12, the reflection of the transmission wave can be suppressed by applying Formulas 17 and 18 or Formulas 22 and 23 to the intermediate layer among given three layers that are in contact with one another and selected from among the inner air layer 171, at least one dielectric layer, the innermost glass layer 121, the intermediate resin layer 123, the outermost glass layer 122, and the outer air layer 172, in accordance with the properties of the transmission wave. The same applies to the case where a ⅙ wavelength shift is tolerable. It goes without saying that these conditions may be applied to only some of the layers. Here, $\theta_a$ is the incident angle of the transmission wave on the layer that is in contact with the inner air layer 171 at the center of the main lobe of the transmitting antenna. Since the laminated glass 12 and the reflection suppression layer 54 are parallel to each other, i.e., they are inclined at the same angle, $\theta_a$ can also be expressed as the angle formed by the normal to the laminated glass 12 and the direction of propagation of the transmission wave at the center of the main lobe of the transmitting antenna, irrespective of the presence or absence the reflection suppression layer 54.

Figure 14:
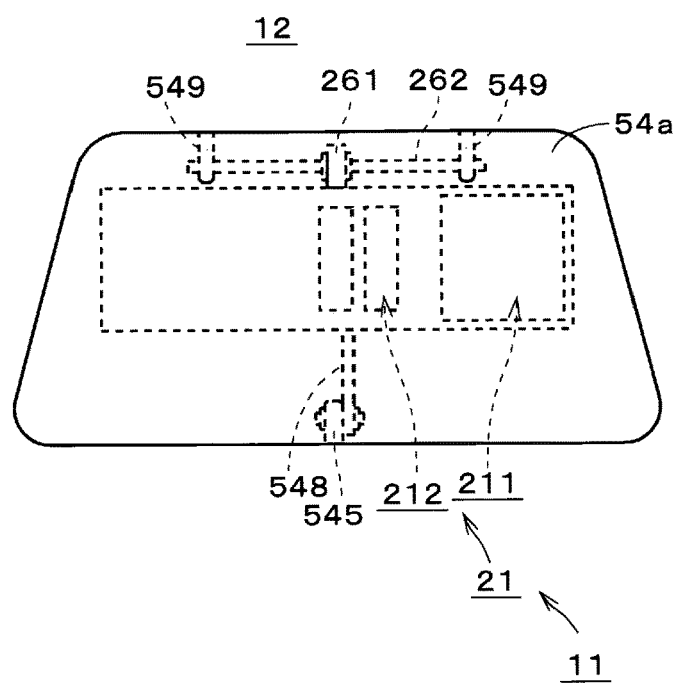
FIG. 14 is a front view showing another example of the reflection suppression layer.
Figure 15:
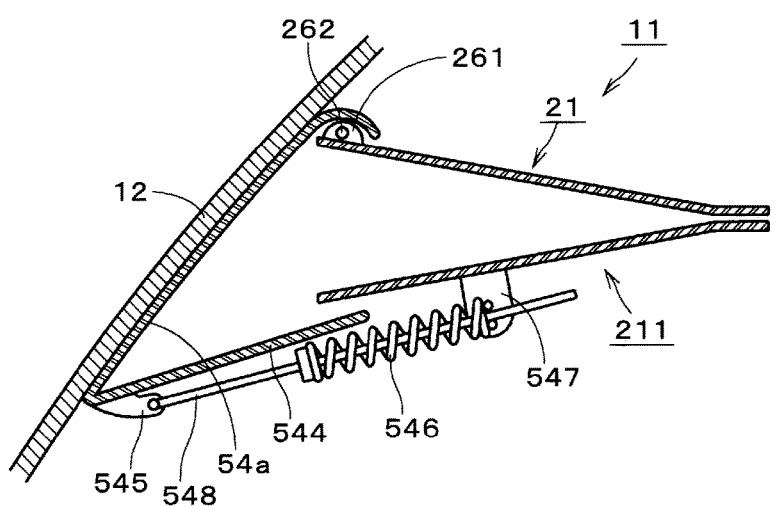
FIG. 15 is a cross-sectional view showing another example of the reflection suppression layer.

FIGS. 14 and 15 show another example of a reflection suppression layer 54a, and illustrate part of the radar device 11 mounted on the laminated glass 12 and the reflection suppression layer 54a. FIGS. 14 and 15 correspond respectively to FIGS. 10 and 11.

The reflection suppression layer 54a includes at least one dielectric layer and has a plate-like shape. The reflection suppression layer 54a is located between the antenna part 21 and the laminated glass 12 and covers the front of the opening of the antenna part 21. The reflection suppression layer 54a also serves as an antenna cover of the radar device 11. In other words, the antenna cover also serves as the reflection suppression layer 54a. Hereinafter, the reflection suppression layer 54a is referred to as a "dielectric cover 54a." A dielectric layer(s) of the dielectric cover 54a may be made of an ABS resin, a polycarbonate resin, a syndiotactic polystyrene resin, or the like. The dielectric cover 54a has flexibility.

The dielectric cover 54a has two bearings 549. The two bearings 549 are fixed at the upper part to the surface on the antenna part 21 side of the dielectric cover 54a. The antenna part 21 has one bearing 261. The bearing 261 is provided at the upper part of the antenna part 21. The bearing 261 is located between the two bearings 549, which are arranged approximately in the horizontal direction. The two bearings 549 and the one bearing 261 share one shaft 262. Thus, the upper part of the dielectric cover 54a is rotatably supported on the upper part of the antenna part 21. For example, the angle of the dielectric cover 54a relative to the antenna part 21 may vary within a range of approximately ±10°. In actuality, the bearing 261 is arranged at a position that is in close proximity to the laminated glass 12, and the shaft 262 applies pressure toward the laminated glass 12 to the top part of the dielectric cover 54a.

The dielectric cover 54a includes a lower cover 544 and a rod 548. The lower cover 544 extends toward the bottom of the antenna part 21. The lower cover 544 includes a bearing 545. The bearing 545 is connected to one end of the rod 548. The bearing 545 rotatably supports the rod 548. The rod 548 is inserted in a coil spring 546. One end on the bearing 545 side of the coil spring 546 is fixed to the rod 548. The other end of the coil spring 546 is in contact with a supporter 547 provided on the bottom of the antenna part 21. The coil spring 546 applies pressure toward the laminated glass 12 to the bottom of the dielectric cover 54a. As a result, the dielectric cover 54a is brought into intimate contact with the surface on the antenna part 21 side of the laminated glass 12, while being bent.

A dielectric layer of the dielectric cover 54a that closely adheres to the surface on the antenna part 21 side of the laminated glass 12 has a thickness that allows reflection of a transmission wave to be suppressed by interference between the reflected wave generated by reflection of the transmission wave on an interface at which the dielectric layer closely adheres to the surface of the laminated glass 12, and the reflected wave generated by reflection of the transmission wave on the surface on the antenna part 21 side of the dielectric layer. In other words, the thickness of the dielectric layer satisfies the relationships expressed by Formulas 17 and 18 if the transmission wave has a vertical polarization component greater than the horizontal polarization component thereof with respect to the dielectric cover 54a. If the transmission wave has a horizontal polarization component greater than or equal to the vertical polarization component thereof with respect to the dielectric cover 54a, the thickness of the dielectric layer satisfies the relationships expressed by Formulas 22 and 23. As a result, this structure will help reduce loss of the transmission wave passing through the laminated glass 12 and improve the efficiency of transmission and reception of radio waves. The same applies to each dielectric layer if the dielectric cover 54a includes a plurality of dielectric layers.

As described previously, the refractive indices of electromagnetic waves in the millimeter waveband differ greatly from those in the other frequency bands. Thus, the refractive indices of radio waves in the millimeter waveband have to be used to evaluate the formulas described above.

The vehicle 1 described above may be modified in various ways.

For example, one antenna may serve as both a transmitting antenna and a receiving antenna. Alternatively, one transmitting antenna may be provided with a mechanism for changing the antenna pattern and transmit both of the first transmission wave and the second transmission wave. As another alternative, one receiving antenna may be provided with a mechanism for changing the receiving antenna pattern and implement both of the near-field monitoring mode and the far-field monitoring mode. In other words, the number of antennas included in the antenna part 21 may be one, and the antenna part 21 may include at least one antenna. It is, of course, preferable for the antenna part 21 to include a plurality of antennas.

The plurality of receiving antennas 215 may include portions arranged in the longitudinal direction, as long as they include portions arranged in the lateral direction. For example, the receiving antennas 215 may be arranged two dimensionally.

The position at which the radar device 11 is mounted is not limited to the windshield, and the radar device 11 may be mounted on the rear glass for the purpose of rearward monitoring. The installation position of the radar device is not limited to a position on glass.

The radar device 11 transmits a transmission wave in approximately the horizontal direction and receives a reflective wave that returns in approximately the horizontal direction. Thus, a similar reflection suppression layer may also be provided on the outer surface of the laminated glass 12.

The vehicle 1 is not limited to a passenger car and may be other vehicles, such as a truck or a train, for use in various applications. The vehicle 1 is not limited to a man-driven vehicle, and may be an unattended vehicle such as an automated guided vehicle used in a factory.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2016-008158 filed in the Japan Patent Office on Jan. 19, 2016, the entire disclosure of which is incorporated herein by reference.

INDUSTRIAL AVAILABILITY

The vehicle including the radar device according to the present invention can be used for various applications.

REFERENCE SIGNS LIST

1 Vehicle
10 Vehicle body
11 (On-vehicle) radar device
12 Laminated glass (windshield)
15 Drive mechanism
21 Antenna part
25 Antenna cover
54 Reflection suppression layer
121 Innermost glass layer
122 Outermost glass layer
123 Intermediate resin layer
171 Inner air layer
172 Outer air layer
213 First transmitting antenna
214 Second transmitting antenna
541 (Outer) dielectric layer
542 Intermediate dielectric layer

The invention claimed is:
1. A vehicle comprising:
a vehicle body;
a drive mechanism that moves the vehicle body;
laminated glass fixed to the vehicle body and located between a vehicle interior and an outside; and
an on-vehicle radar device fixed directly or indirectly to an inner surface of the laminated glass, a rear-view mirror arranged inward of the inner surface, or a ceiling; wherein
the laminated glass includes an innermost glass layer, an outermost glass layer, and an intermediate resin layer sandwiched between the innermost glass layer and the outermost glass layer, a first air layer being positioned inward from the innermost glass layer and a second air layer is provided outward from the outermost air layer;
the on-vehicle radar device includes an antenna part that transmits a transmission wave from inside the innermost glass layer to outside the outermost glass layer, the transmission wave being a radio wave in a millimeter waveband, and receiving a received wave that enters inside the innermost glass layer from outside the outermost glass layer;
the antenna part includes a transmitting antenna that transmits the transmission wave, the transmitting antenna including a main lobe;
the transmission wave has a vertical polarization component greater than a horizontal polarization component thereof with respect to the laminated glass;

If $n_1 < n_2 < n_3$ or $n_1 > n_2 > n_3$ and $\theta_a$ is smaller than or greater than both of $\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N + \frac{3}{4}\right)n_2\lambda\cos\left(\sin^{-1}\left(\frac{1}{n_2}\sin\theta_a\right)\right)}{4(n_2^2 - \sin^2\theta_a)} \leq d_2 \leq$$

$$\frac{\left(2N + \frac{5}{4}\right)n_2\lambda\cos\left(\sin^{-1}\left(\frac{1}{n_2}\sin\theta_a\right)\right)}{4(n_2^2 - \sin^2\theta_a)}, \text{ and}$$

-continued if $n_1 < n_2 < n_3$ or $n_1 > n_2 > n_3$ and $\theta_a$ is value between or equal to one of $\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N+\frac{7}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{9}{4}\right)n_2\lambda\cos\left(\sin^{-1}\left(\frac{1}{n_2}\sin\theta_a\right)\right)}{4(n_2^2-\sin^2\theta_a)} \text{; and}$$

If $n_1 > n_2 < n_3$ or $n_1 < n_2 > n_3$ and $\theta_a$ is smaller than or greater than both of $\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N+\frac{7}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{9}{4}\right)n_2\lambda\cos\left(\sin^{-1}\left(\frac{1}{n_2}\sin\theta_a\right)\right)}{4(n_2^2-\sin^2\theta_a)}, \text{ and}$$

if $n_1 > n_2 < n_3$ or $n_1 < n_2 > n_3$ and $\theta_a$ is a value between or equal to one of $\sin^{-1}\left(n_1\sin\left(\tan^{-1}\frac{n_2}{n_1}\right)\right)$ and $\sin^{-1}\left(n_2\sin\left(\tan^{-1}\frac{n_3}{n_2}\right)\right)$, $$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)}.,$$

where (i) $\theta_a$ is an angle defined by a normal to the laminated glass and a direction of propagation of the transmission wave at a center of the main lobe of the transmitting antenna, (ii) $n_1$, and $n_2$, and $n_3$ are refractive indices of an inner layer, a middle layer, and an outer layer that are in contact with one another and selected from the first air layer, the innermost glass layer, the intermediate resin layer, the outermost glass layer, and the second air layer, (iii) $d_2$ is a thickness of the middle layer, and (iv) N is an integer of 0 or more.

2. The vehicle according to claim 1, wherein
the innermost glass layer and the outermost glass layer have a same thickness and a same refractive index.

3. The vehicle according to claim 1, wherein
the middle layer is the outermost glass layer; and $(\theta_b-10°) \le \theta_a \le (\theta_b+5°)$ where $\theta_b$ is a Brewster angle of the radio wave on an inner surface of the innermost glass layer.

4. The vehicle according to claim 2, wherein
the middle layer is the outermost glass layer; and $(\theta_b-10°) \le \theta_a \le (\theta_b+5°)$ $\theta_b$ is a Brewster angle of the radio wave on an inner surface of the innermost glass layer.

5. A vehicle comprising:
a vehicle body;
a drive mechanism that moves the vehicle body;
laminated glass fixed to the vehicle body and located between a vehicle interior and an outside; and
an on-vehicle radar device fixed directly or indirectly to an inner surface of the laminated glass, a rear-view mirror arranged inward of the inner surface, or a ceiling; wherein
the laminated glass includes an innermost glass layer, an outermost glass layer, and an intermediate resin layer sandwiched between the innermost glass layer and the outermost glass layer, a first air layer being positioned inward from the innermost glass layer and a second air layer is provided outward from the outermost air layer;
the on-vehicle radar device includes an antenna part that transmits a transmission wave from inside the innermost glass layer to outside the outermost glass layer, the transmission wave being a radio wave in a millimeter waveband, and receiving a received wave that enters inside the innermost glass layer from outside the outermost glass layer;
the antenna part includes a transmitting antenna that transmits the transmission wave, the transmitting antenna including a main lobe;
the transmission wave has a horizontal polarization component greater than a vertical polarization component thereof with respect to the laminated glass; and If $n_1 < n_2 < n_3$ or $n_1 > n_2 > n_3$, $$\frac{\left(2N+\frac{3}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{5}{4}\right)n_2\lambda\cos\left(\sin^{-1}\left(\frac{1}{n_2}\sin\theta_a\right)\right)}{4(n_2^2-\sin^2\theta_a)} \text{ and}$$

If $n_1 > n_2 < n_3$ or $n_1 < n_2 > n_3$, $$\frac{\left(2N+\frac{7}{4}\right)n_2\lambda\cos\left(\sin^{-1}\left(\frac{1}{n_2}\sin\theta_a\right)\right)}{4(n_2^2-\sin^2\theta_a)} \le$$

$$d_2 \le \frac{\left(2N+\frac{9}{4}\right)n_2\lambda\cos\left(\sin^{-1}\left(\frac{1}{n_2}\sin\theta_a\right)\right)}{4(n_2^2-\sin^2\theta_a)}.,$$

where (i) $\theta_a$ is an angle formed by a normal to the laminated glass and a direction of propagation of the transmission wave at a center of the main lobe of the transmitting antenna, (ii) $n_1$, $n_2$, and $n_3$ are refractive indices of an inner layer, a middle layer, and on outer layer that are in connect with one another and selected from the first, and the second air layer the innermost glass layer, the intermediate resin layer, the outermost glass layer, and the second air layer, (iii) $d_2$ is a thickness of the middle layer, and (iv) N is an integer of 0 or more.

6. The vehicle according to claim 1, wherein
the antenna part includes another transmitting antenna that transmits another transmission wave having a radiation pattern different from a radiation pattern of the transmission wave.

7. The vehicle according to claim 5, wherein
the antenna part includes another transmitting antenna that transmits another transmission wave having a radiation pattern different from a radiation pattern of the transmission wave.

8. The vehicle according to claim 1, wherein
the intermediate resin layer is made of polyvinyl butyrate.

9. The vehicle according to claim 5, wherein the intermediate resin layer is made of polyvinyl butyrate.

10. The vehicle according to claim 1, wherein each of at least one antenna included in the antenna part is a horn antenna, a lens antenna, a printed antenna, a microstrip antenna, or a slit antenna.

11. The vehicle according to claim 5, wherein each of at least one antenna included in the antenna part is a horn antenna, a lens antenna, a printed antenna, a microstrip antenna, or a slit antenna.

12. The vehicle according to claim 1, wherein every antenna included in the antenna part is a horn antenna.

13. The vehicle according to claim 5, wherein every antenna included in the antenna part is a horn antenna.

14. The vehicle according to claim 1, further comprising:
a reflection suppression layer including a dielectric layer that closely adheres to a surface on the antenna part side of the laminated glass;
wherein the dielectric layer has a refractive index that is lower than a refractive index of the innermost glass layer and higher than a refractive index of air; and
the dielectric layer has a thickness that allows reflection of the transmission wave to be suppressed by interference between a reflected wave generated by reflection of the transmission wave on an interface at which the dielectric layer closely adheres to the surface of the laminated glass, and a reflected wave generated by reflection of the transmission wave on a surface on the antenna part side of the dielectric layer.

15. The vehicle according to claim 5, further comprising:
a reflection suppression layer including a dielectric layer that closely adheres to a surface on the antenna part side of the laminated glass;
wherein the dielectric layer has a refractive index that is lower than a refractive index of the innermost glass layer and higher than a refractive index of air; and
the dielectric layer has a thickness that allows reflection of the transmission wave to be suppressed by interference between a reflected wave generated by reflection of the transmission wave on an interface at which the dielectric layer closely adheres to the surface of the laminated glass, and a reflected wave generated by reflection of the transmission wave on a surface on the antenna part side of the dielectric layer.

16. The vehicle according to claim 14, wherein the reflection suppression layer includes another dielectric layer that closely adheres to the surface on the antenna part side of the dielectric layer; and
the another dielectric layer has a thickness that allows reflection of the transmission wave to be suppressed by interference between a reflected wave generated by reflection of the transmission wave on an interface at which the another dielectric layer closely adheres to the dielectric layer, and a reflected wave generated by reflection of the transmission wave on a surface on the antenna part side of the another dielectric layer.

17. The vehicle according to claim 15, wherein the reflection suppression layer includes another dielectric layer that closely adheres to the surface on the antenna part side of the dielectric layer; and
the another dielectric layer has a thickness that allows reflection of the transmission wave to be suppressed by interference between a reflected wave generated by reflection of the transmission wave on an interface at which the another dielectric layer closely adheres to the dielectric layer, and a reflected wave generated by reflection of the transmission wave on a surface on the antenna part side of the another dielectric layer.

18. The vehicle according to claim 16, wherein the another dielectric layer has a refractive index that is lower than the refractive index of the dielectric layer and higher than the refractive index of air.

19. The vehicle according to claim 17, wherein the another dielectric layer has a refractive index that is lower than the refractive index of the dielectric layer and higher than the refractive index of air.

20. The vehicle according to claim 14, wherein an incident angle of the transmission wave on the reflection suppression layer at a center of a main lobe of the transmitting antenna is greater than 10 degrees.

21. The vehicle according to claim 15, wherein an incident angle of the transmission wave on the reflection suppression layer at a center of a main lobe of the transmitting antenna is greater than 10 degrees.

22. The vehicle according to claim 14, further comprising:
an antenna cover located between the antenna part and the laminated glass and covering a front of the antenna part;
wherein the antenna cover also serves as the reflection suppression layer.

23. The vehicle according to claim 15, further comprising:
an antenna cover located between the antenna part and the laminated glass and covering a front of the antenna part;
wherein the antenna cover also serves as the reflection suppression layer.

* * * * *